(12) United States Patent
Kubokawa et al.

(10) Patent No.: US 6,860,916 B2
(45) Date of Patent: Mar. 1, 2005

(54) FILTER ASSEMBLY

(75) Inventors: James O. Kubokawa, Saint Paul, MN (US); Ben G. Rogowski, Richfield, MN (US); Thomas A. Tedham, Eden Prairie, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/172,575

(22) Filed: Jun. 14, 2002

(65) Prior Publication Data

US 2003/0230062 A1 Dec. 18, 2003

(51) Int. Cl.[7] .............................................. B01D 46/00
(52) U.S. Cl. .......................... 55/495; 55/497; 55/499; 55/500; 55/501; 55/502; 55/503; 55/521; 55/357; 55/DIG. 31
(58) Field of Search .......................... 55/495, 497, 499, 55/500, 501, 502, 503, 521, 356, 357, DIG. 31

(56) References Cited

U.S. PATENT DOCUMENTS

| | | | |
|---|---|---|---|
| 2,074,294 A | * | 3/1937 | Woodruff ..................... 55/499 |
| 2,130,107 A | | 9/1938 | Somers |
| 2,423,741 A | | 7/1947 | Vokes et al. |
| 2,907,408 A | * | 10/1959 | Engle et al. ................. 55/500 |
| 3,183,286 A | | 5/1965 | Harms |
| 3,187,489 A | | 6/1965 | Bauder et al. |
| 3,280,984 A | | 10/1966 | Sexton et al. |
| 3,373,546 A | | 3/1968 | Setnan |
| 3,494,113 A | | 2/1970 | Kinney |
| 3,624,161 A | | 11/1971 | Bub |
| 3,712,033 A | | 1/1973 | Gronholz |
| 3,774,377 A | | 11/1973 | Bishop |
| 3,789,589 A | | 2/1974 | Delany et al. |
| 3,853,529 A | * | 12/1974 | Boothe et al. ................. 55/499 |
| 4,042,358 A | | 8/1977 | Frohmader |

(List continued on next page.)

FOREIGN PATENT DOCUMENTS

| | | |
|---|---|---|
| CA | 1011265 | 5/1977 |
| CA | 1073826 | 3/1980 |
| JP | 4-131112 | 5/1992 |
| JP | 9-287811 | 11/1997 |
| JP | 10-156121 | 6/1998 |

*Primary Examiner*—Duane Smith
*Assistant Examiner*—Jason M. Greene
(74) *Attorney, Agent, or Firm*—David B. Patchett

(57) ABSTRACT

A filter assembly includes a reusable filter frame and a collapsible and expandable filter element. The filter frame includes a base and a cover connected with the base. The base includes a plurality of longitudinal rails and a plurality of transverse ribs for supporting and spacing the filter element. The filter frame also includes a securing mechanism for securing the filter element to the frame and maintaining the filter element in its expanded condition. The filter element includes filter media having a plurality of pleats adapted to mesh with the ribs of the filter frame and a flexible spacing structure attached to the pleated media that provides the pleated media with uniform pleat spacing but allows the media to be collapsed to a compact form.

34 Claims, 4 Drawing Sheets

U.S. PATENT DOCUMENTS

| | | | |
|---|---|---|---|
| 4,135,900 A | * 1/1979 | Westlin et al. | 55/499 |
| 4,363,643 A | * 12/1982 | Elbrader et al. | 55/499 |
| 4,547,950 A | * 10/1985 | Thompson | 55/499 |
| 4,549,887 A | 10/1985 | Joannou | |
| 4,617,122 A | 10/1986 | Kruse et al. | |
| 4,701,196 A | 10/1987 | Delany | |
| 4,756,728 A | 7/1988 | Conrad | |
| 4,762,053 A | 8/1988 | Wolfert | |
| 4,978,375 A | 12/1990 | Il Yoo | |
| 4,999,038 A | 3/1991 | Lundberg | |
| 5,015,377 A | 5/1991 | Silvera | |
| 5,059,218 A | 10/1991 | Pick | |
| 5,075,000 A | 12/1991 | Bernard et al. | |
| 5,108,470 A | 4/1992 | Pick | |
| 5,217,513 A | 6/1993 | Armbruster | |
| 5,252,111 A | 10/1993 | Spencer et al. | |
| 5,273,563 A | 12/1993 | Pasch et al. | |
| 5,273,564 A | 12/1993 | Hill | |
| 5,399,180 A | 3/1995 | Kopp | |
| 5,458,772 A | * 10/1995 | Eskes et al. | 55/DIG. 31 |
| 5,464,461 A | 11/1995 | Whitson et al. | |
| 5,505,852 A | 4/1996 | van Rossen | |
| 5,571,300 A | 11/1996 | Stemmer | |
| 5,595,107 A | 1/1997 | Bivens | |
| 5,613,991 A | 3/1997 | Esaki et al. | |
| 5,618,324 A | 4/1997 | Sommer et al. | |
| 5,639,287 A | 6/1997 | Van de Graaf et al. | |
| 5,667,562 A | * 9/1997 | Midkiff | 55/528 |
| 5,743,927 A | 4/1998 | Osendorf | |
| 5,779,747 A | 7/1998 | Schlör et al. | |
| 5,792,228 A | 8/1998 | Fath et al. | |
| 5,809,800 A | 9/1998 | Deal | |
| 5,814,219 A | 9/1998 | Friedmann et al. | |
| 5,820,644 A | 10/1998 | Mori et al. | |
| 5,840,094 A | 11/1998 | Osendorf et al. | |
| 5,846,302 A | 12/1998 | Putro | |
| 5,958,097 A | 9/1999 | Schlör et al. | |
| 5,968,217 A | 10/1999 | Stein et al. | |
| 6,030,427 A | 2/2000 | Sorice et al. | |
| 6,033,453 A | * 3/2000 | Weddell, III | 55/DIG. 31 |
| 6,059,852 A | 5/2000 | Olson | |
| 6,165,241 A | * 12/2000 | Choi | 55/521 |
| 6,179,891 B1 | 1/2001 | Knudsen et al. | |
| 6,228,152 B1 | 5/2001 | Guérin et al. | |
| 6,258,143 B1 | * 7/2001 | Carawan et al. | 55/499 |
| 6,328,778 B1 | 12/2001 | Richerson et al. | |
| 6,521,011 B1 | * 2/2003 | Sundet et al. | 55/499 |
| 6,599,343 B2 | * 7/2003 | Fredrick et al. | 55/499 |

* cited by examiner

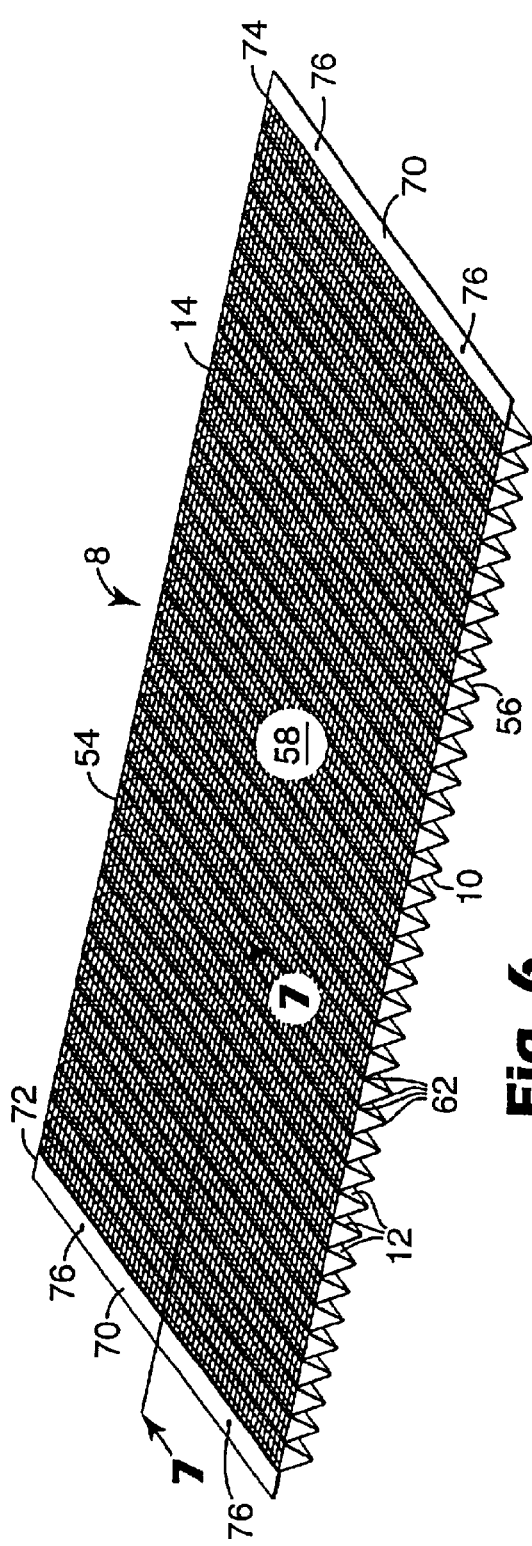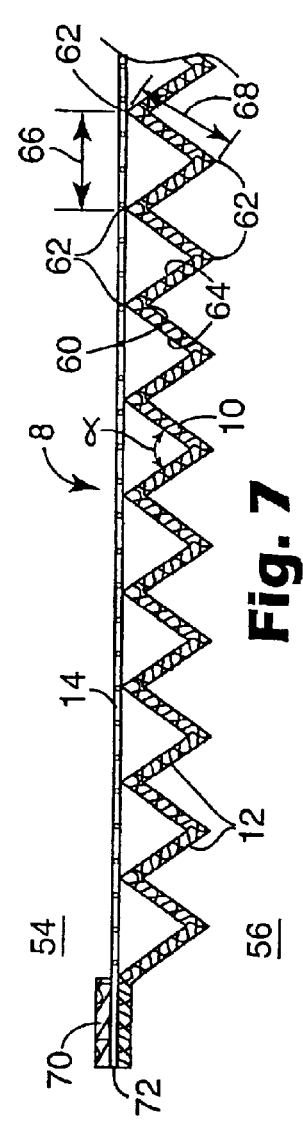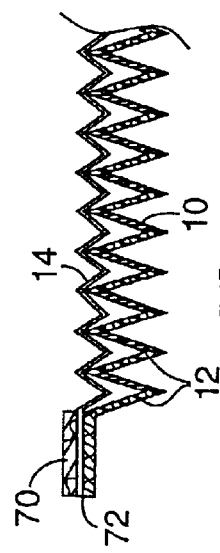

FILTER ASSEMBLY

FIELD OF THE INVENTION

The present invention relates generally to filters and, more particularly, to a filter assembly including a reusable frame and a collapsible, replaceable, pleated filter element.

BACKGROUND OF THE INVENTION

Many conventional residential heating and cooling systems include a disposable filter. These filters typically include a frame, a filter material formed of glass fibers or similar material, and a mesh screen or the like that supports the filter material. After a period of use, these filters become dirty or clogged and must be replaced. This is accomplished by replacing the entire filter assembly with a new filter and discarding the old one. Depending on the use of the filter, replacement may be required several times a year. Because the frame and screen are discarded with the assembly even though it is only the filter material that is no longer functional, there is unnecessary waste and cost associated with such filters. In addition, because these filters are rather bulky, they are often purchased as they are needed rather than keeping a large supply on hand. Because purchasing a new filter is not always convenient, replacement can be delayed resulting in reduced efficiency of the system.

Filter assemblies with frames and removable filter elements are known in the prior art. U.S. Pat. No. 3,280,984 (Sexton et al.), for example, discloses a filter assembly comprising a support frame including upstream and downstream grid retaining panels and a flat pad of filter medium disposed in the frame.

U.S. Pat. No. 3,774,377 (Bishop) discloses a filter assembly with a replaceable filter element including a frame, a disposable and replaceable filter medium, and means for retaining the filter medium in a fixed position in the frame.

U.S. Pat. No. 3,789,589 (Delany et al.) discloses a filter assembly including a casing and a drawer arranged in the casing that contains pleated filter media. The drawer includes a plurality of comb-like assemblies having pointed fingers that are disposed in the pockets of the pleated filter media to prevent the filter from collapsing. The filter includes strips extending across each end portion of the downstream side of the filter so the side edges of the downstream folds will be equally spaced.

U.S. Pat. No. 4,042,358 (Frohmader) discloses an air filter formed into an accordion-shaped body having reverse folds forming pockets. The filter includes a string-like pleat spacing member that passes through a series of openings in the pleat walls. The spacing member is intended to equally space the pleats when the filter is in its expanded condition.

U.S. Pat. No. 5,840,094 (Osendorf et al.) discloses a filter assembly including first and second frame members, a filter element, and separate comb-like spacers for retaining the filter pleats in an open spaced manner.

U.S. Pat. No. 6,033,453 (Weddell, III) discloses a reusable frame support rack for supporting and retaining an outstretched, replaceable pleated media filter core. The frame includes a pair of longitudinal angles extending between a pair of transverse angles which carry a flat expanded metal support or reinforcement system.

There remains a need, however, for a filter assembly including a reusable frame and a collapsible, replaceable, pleated filter element that is easy to assemble and use.

It would therefore be desirable to provide a filter assembly including a reusable frame and a collapsible replaceable pleated filter element that can be collapsed for compact shipping, storage, and disposal but can be quickly and easily expanded with uniform spacing and installed in the frame.

SUMMARY OF THE INVENTION

In one embodiment, the present invention provides a filter assembly including a filter frame and a reversibly expandable filter element that can be collapsed for compact shipping, storage, and disposal but can be quickly and easily expanded and inserted in the frame. The base includes at least one longitudinal rail for supporting the filter element. The filter element comprises filter media having a plurality of pleats and a flexible spacing structure attached to the filter media, each pleat including a fold line defining a pleat tip and a pair of adjacent panels. The length of the spacing structure between successive pleats is less than the length of a panel measured from one pleat tip to the next alternating pleat tip.

In another embodiment, the present invention provides a filter assembly comprising a filter frame including a base having at least one longitudinal rail and a plurality of transverse ribs, a cover movably connected with said base, and a replaceable filter element removably arranged in the filter frame. The filter element comprises filter media having a plurality of pleats adapted to mesh with the ribs and a flexible spacing structure attached to said filter media, each pleat including a fold line defining a pleat tip and a pair of adjacent panels. The length of the spacing structure between successive pleat tips is less than the length of a panel measured from one pleat tip to the next alternating pleat tip.

In another embodiment, the number of ribs generally corresponds to the number of upstream or downstream pleat openings in the filter element, whereby a rib is provided in each downstream pleat opening, and the ribs mesh with the pleats in the filter element. In this manner, the filter element can be expanded and placed into the filter frame such that the pleats mesh with the ribs.

BRIEF DESCRIPTION OF THE DRAWINGS

The present invention will be further described with reference to the accompanying drawings, in which:

FIG. 6 is a perspective view of the filter element in its fully expanded condition;

FIG. 7 is a sectional view taken along line 7—7 of FIG. 6; and

FIG. 8 is a side view of the filter element in a partially collapsed condition.

DETAILED DESCRIPTION

Figure 1:
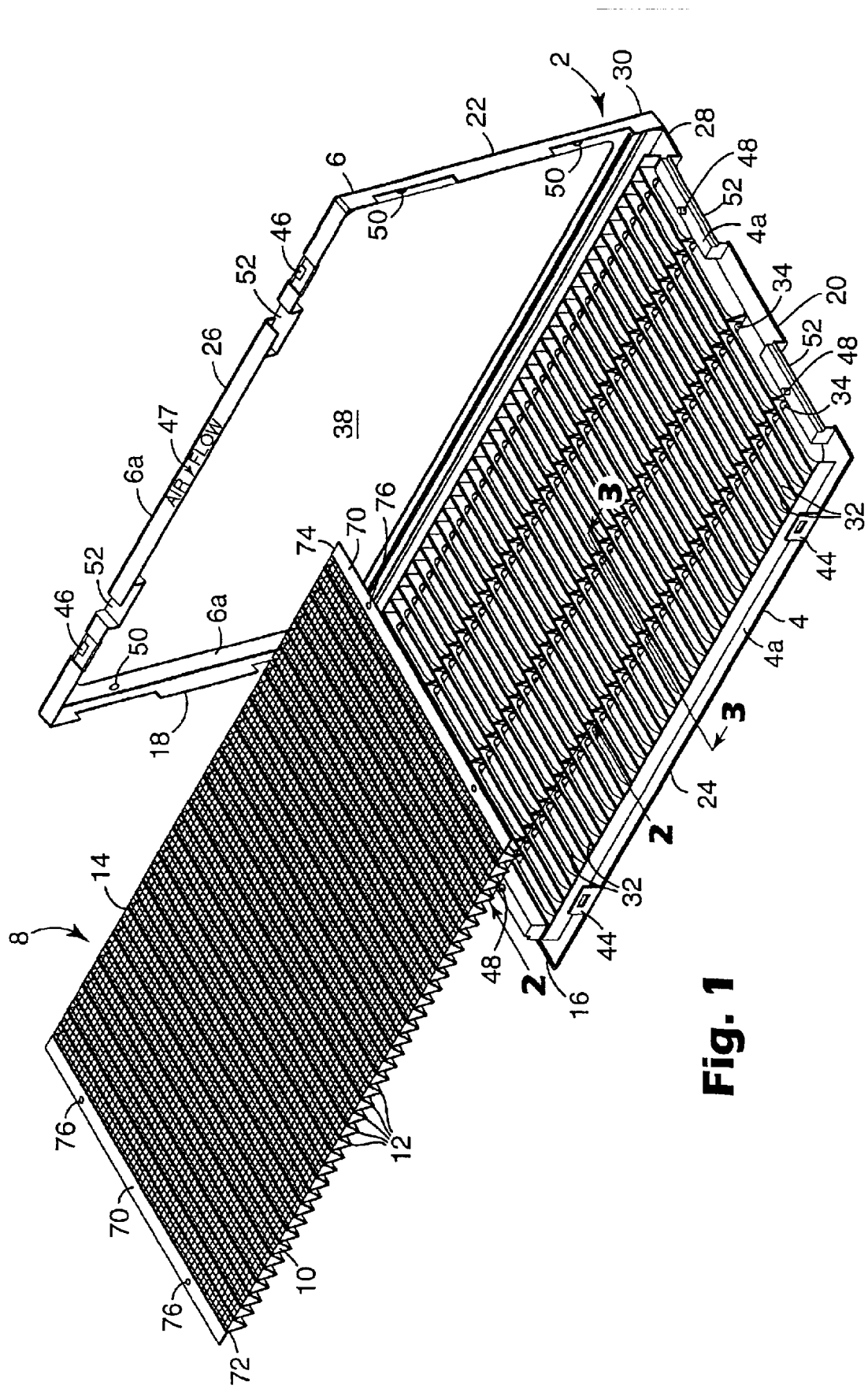
FIG. 1 is a perspective view showing a reusable filter frame with a replaceable filter element according to the invention.
Figure 2:
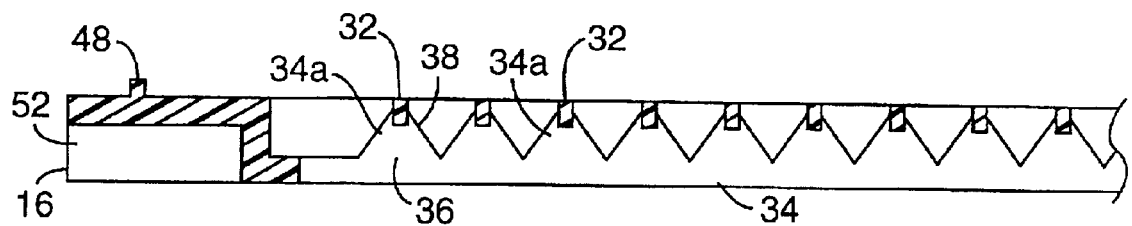
FIG. 2 is a sectional view taken along line 2—2 of FIG. 1.
Figure 3:
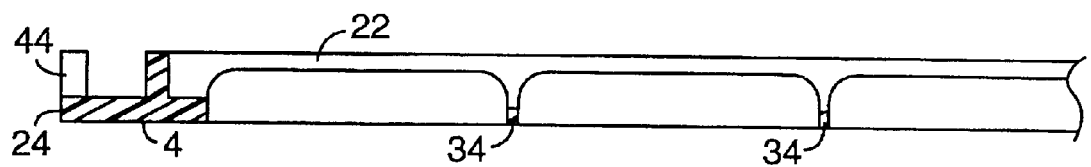
FIG. 3 is a sectional view taken along line 3—3 of FIG. 1.
Figure 5:
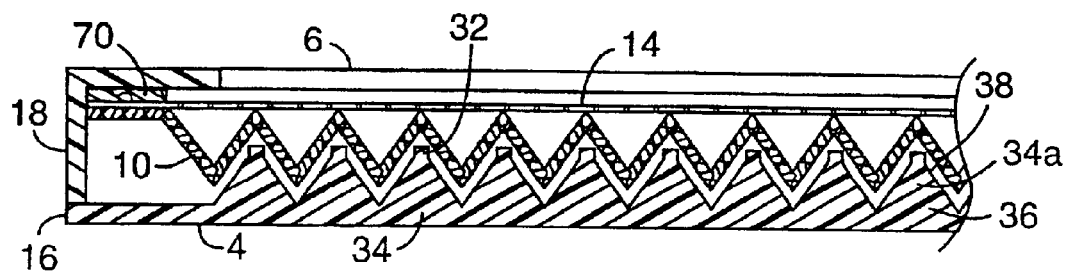
FIG. 5 is a sectional view taken along line 5—5 of FIG. 4.
Figure 4:
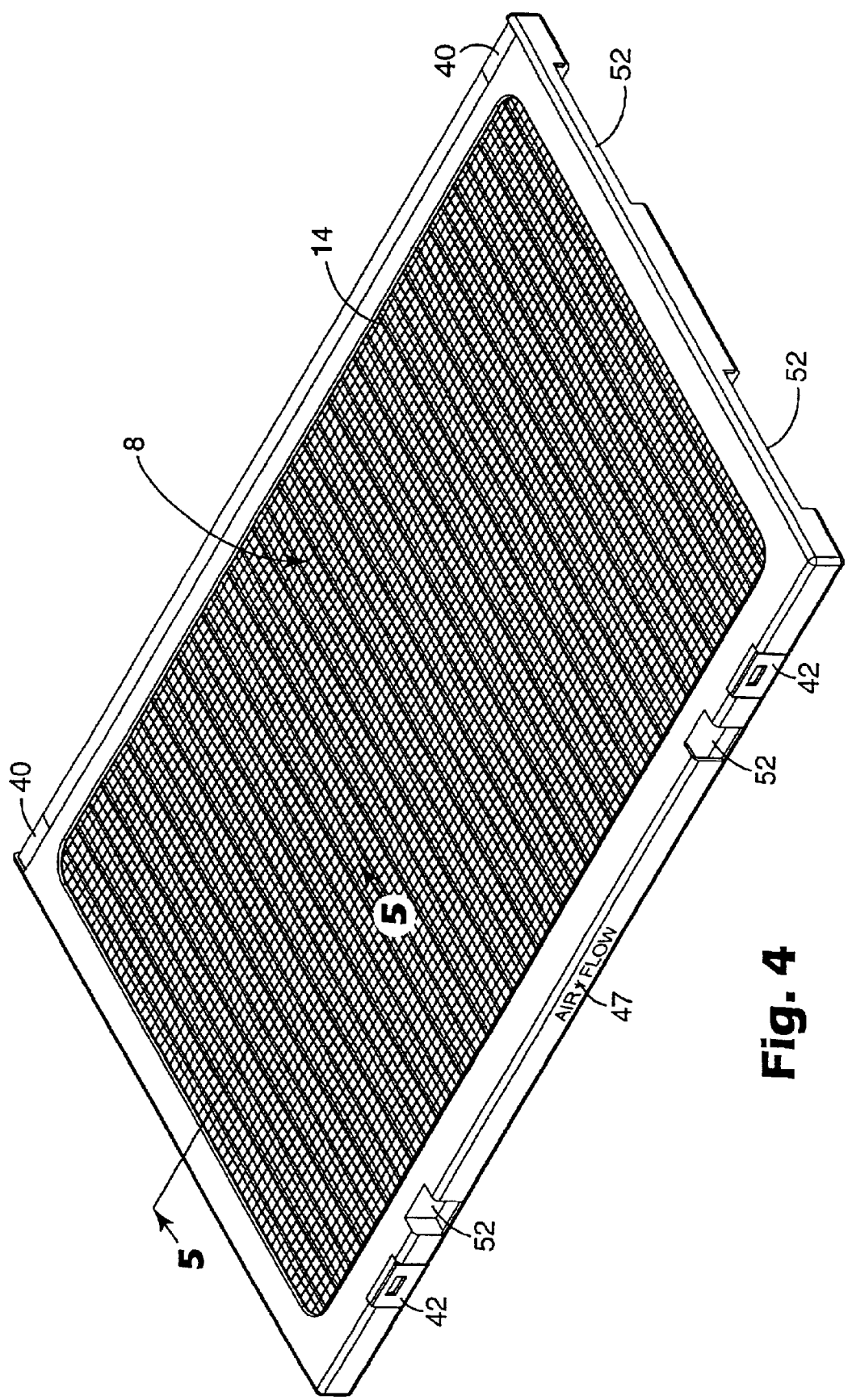
FIG. 4 is a perspective view showing the filter element installed in the filter frame.

Referring now to the drawings, wherein like reference numerals refer to like or corresponding parts throughout the several views, FIGS. 1–5 show a reusable filter frame 2 including a base 4 and an optional cover 6 for use with a removable pleated filter element 8 having an appropriate size and configuration to fit into the base 4. Alternatively, the function of the base 4 and cover 6 may be reversed so that the filter element 8 is arranged in the cover 6 and the base 4 is closed with the cover 6. The filter frame 2 has a generally planar rectangular configuration and intended for use in an air duct of a residential air handling system, such as a furnace.

The filter element 8 generally includes filter media 10 having a plurality of pleats 12 and a spacing structure 14 attached to successive pleat tips. The filter element 8 is described more fully below with reference to FIGS. 6–8.

The base 4 and cover 6 include perimeter structures 4a, 6a, respectively, having corresponding first ends 16, 18 and second ends 20, 22, respectively, and first sides 24, 26 and second sides 28, 30, respectively. A plurality of equally spaced transverse ribs 32 extend from the first side 24 of the base 4 to the second side 28 of the base 4 that mesh with the pleats 12 and thereby support the filter media 10 and provide uniform spacing of the pleats 12. To provide complete and uniform spacing of each pleat 12, the ribs 32 are preferably continuous, other than discontinuities that may be required as part of the molding process, and have a uniform height. In addition, the number of ribs 32 is preferably corresponds to the number of pleats 12 on the downstream side of the filter element 8 so that one rib 32 is arranged in each downstream pleat opening. The ribs 32 may be molded with the perimeter structure 4a of the base 4 or they may be wires, dowels, or other members that are attached to the perimeter structure 4a of the base 4.

The base 4 also optionally includes a plurality of longitudinal rails 34 extending from the first end 16 to the second end 20 that combine with the transverse ribs 32 to form a grid structure. The ribs 32 and rails 34 can be formed as separate members or as a unitary structure. The rails 34 are shown with optional triangularly-shaped spacer portions 34a that generally follow the contour of the filter pleats 12, thereby providing spacing for the pleats 12. Each spacer portion 34a includes a base 36 along the rail 34 and an apex 38 adjacent a corresponding rib 32. The ribs 32 and rails 34 are preferably formed of a synthetic plastic material such as ABS (acrylonitrile butadiene styrene) or HIPS (high impact polystyrene) but may also be formed of other conventional materials such as wire or flat metal fins.

The cover 6 contains a central opening 38 that allows air to flow through the frame 2 to the filter element 8 so that contaminants can be removed from the air stream. The cover 6 inter-engages the periphery of the base 4 to securely retain the filter element 8 in the frame 2 and to prevent air from flowing around the filter element 8. The base 4 and cover 6 are pivotally connected along their second sides 28, 30, respectively, via hinge members 40 (FIG. 4) in the form of flexible straps. Other conventional hinges may also be used. In this manner, the frame 2 is movable between an open condition (FIG. 1) wherein the base 4 and cover 6 first side edges 24, 26, respectively, are displaced to allow the filter element 8 to be installed in or removed from the frame 2, and a closed condition (FIG. 4) wherein the base 4 and cover 6 first side edges 24, 26 respectively, are engaged to enclose the filter element 8 in the frame 2. It will be recognized that any conventional hinge may also be used to connect the base 4 with the cover 6. Alternatively, the frame 2 may have a single-piece unitary construction wherein the base 4 and cover 6 are joined by a living hinge, formed, for example, by injection molding. It will be recognized that the base 4 and cover 6 may also be formed as two separate pieces that snap together or otherwise interlock.

A pair of optional latches 42 (FIG. 4) each including a flexible cantilevered bar member 44 (FIG. 1) that snap fits over an aligned protrusion 46 (FIG. 1) are provided to maintain the frame 2 in its closed condition. Other conventional closures or mechanical fasteners such as hook and loop, elastic bands, locks, or the like may also be used.

The cover 6 may also optionally include transverse and/or longitudinal support bars (not shown) similar to those provided in the base 4 that serve to further retain the filter media 10 in the frame. Such support bars serve a safety function and prevent the filter media 10 from ballooning out of the frame in case the frame is inadvertently inserted backward in an air duct. When inserted backward, the filter will not perform properly because the pleats are not supported by the ribs 32 and will therefore tend to collapse in use, but the filter media will be retained in the frame 2 so that any damage to the system is avoided.

To ensure that the frame 2 is installed correctly in the air duct with the cover 6 upstream and the base 4 downstream so that air travels successively through the cover 6, the filter element 8, and the base 4, a visual indicator 47 is provided on the frame 2 showing the proper orientation of the frame relative to the direction of the air flow. Additional instructions may be provided to ensure the frame is properly arranged in the air duct.

Protrusions 48 provided in the first 16 and second 20 ends of the base 4 serve as securing mechanisms to attach the filter element 8 to the base 4 when the filter element 8 is installed in the frame 2. Each protrusion 48 engages an aligned hole 50 contained in the first 18 and second 22 ends of the cover 6. Other suitable securing mechanisms include adhesive, hook and loop fasteners, clips, clamps, clasps, hooks, or the like. Alternatively, the filter element 8 may be secured in the frame 2 by simply capturing or pinching the ends of the filter element between the base 4 and the cover 6.

The frame 2 is generally intended as a frame for a residential air filter for use in, for example, a furnace, a window air conditioning unit, or a kitchen range hood. Accordingly, the frame 2 generally has a depth or thickness of ½ inch to 5 inches, preferably between ¾ inch to 1¼ inches, and more preferably approximately an inch thick. The height of the frame 2 is generally between 5 inches and 24 inches, and preferably between 10 inches and 20 inches. The width of the frame is generally between 18 inches and 10 inches, and preferably between 20 inches and 30 inches.

To facilitate the installation and removal of the frame 2 from an air duct, indentations 52 are provided in the ends 16, 20 of the base 4 and side 26 of the cover 6. The indentations provide a narrow gripping region along the periphery of the frame that can be readily grasped by a user during the installation and removal process.

Referring now to FIGS. 6–8, there is shown the accordion pleated replaceable filter element 8 in greater detail. The filter element 8 includes reversibly expandable and collapsible filter media 10 having an inlet face 54 and an outlet face 56, and a flexible inelastic spacing structure 14 arranged over the inlet face 54. The spacing structure 14 allows the filter element 8 to be quickly and easily expanded to a fixed spacing and inserted into the base 4. While the outlet face 56 is preferably left open to allow the ribs 32 to enter the pleat structure, the filter element 8 may additionally include a second spacing structure (not shown) along the filter media outlet side 56. Such a filter element would preferably be constructed from a self-supporting media and would be used with a filter frame that does not include ribs 32.

This construction allows the filter element 8 to be collapsed to a compact form for shipping and storage and to later be re-expanded to a fixed spacing and attached to the frame 2. The spacing structure 14 is thin and flexible so it can fold in between the pleats 12 or outwardly away from the pleats 12 when the filter element 8 is collapsed into its compressed state as shown in FIG. 8. Suitable spacing structures 14 include scrims, screens, nets, mesh structures, or the like formed of, for example, metals, synthetic plastic materials, or natural fibers such as cotton thread. The spacing structure 14 may also have filtration properties in addition to acting as a spacer.

To ensure reliable uniform down web spacing and cross web stability, and to ensure easy handling of the filter element 8, the spacing structure 14 is preferably provided over the entire inlet face 54. If not provided over the entire inlet face 54, the spacing structure 14 is preferably provided over an interior face region 58 of the media 10. This may be accomplished, for example, by providing the spacing structure 14 in the form of one or more strips extending across the interior face region 58 of the media 10 arranged perpendicular to the direction of pleating and attached to successive pleats 12. The expression "interior face region" refers to the area extending inwardly from the peripheral region of the media 10 adjacent the outer edge of the filter element 8 and includes the central area of the filter element 8. By providing the spacing structure at least in the interior face region 58 of the media 10, the filter element 8 is easy to expand to its full length while preventing over expansion.

The media 10 includes a plurality of pleats 12 each including a fold line 60 defining a pleat tip 62 and a pair of adjacent panels 64. Successive pleat tips on the inlet side 54 define a planar attachment surface to which the spacing structure 14 is attached. The spacing structure 14 is preferably adhesively bonded to the media 10 but other conventional attachment means such as heat lamination or ultrasonic welding may also be used.

The length 66 of the spacing structure 14 between successive pleat tips 62 forming the attachment surface is less than two times the length 68 of a panel 64 as measured from one pleat tip 62 to the next alternating pleat tip 62. In this manner, when the filter element 8 is fully expanded, the spacing structure 14 forms a generally planar structure and adjacent panels 64 form an angle α of less than 180 degrees. The length of the spacing structure 14 between successive pleat tips 62 is preferably less than the length 68 of a panel 64 measured from one pleat tip 62 to the next alternating pleat tip, whereby adjacent panels 64 form an angle α of less than 60 degrees when the filter element 8 is in its fully expanded condition. To achieve equal and uniform spacing of the pleats 12, the length of the spacing structure 14 between each successive pleat tip 62 is the same.

The spacing distance between successive pleat tips 62 depends of the size of the filter but generally ranges from about 2 millimeters to about 40 millimeters. For most applications, however, the spacing distance between successive pleat tips 62 is preferably at least 5 millimeters and, more preferably, at least 8 millimeters.

Elongate attachment members 70 are provided along opposite ends 72, 74 of the filter element 8 parallel to the fold lines 60. The attachment members 70 preferably have a stiffness greater than the stiffness of the filter media 10. The attachment members 70 provide the ends 72, 74 of the filter element 8 with increased stiffness, thereby improving the handlability of the filter element 8 and allowing the filter element 8 to be expanded easily and uniformly. In addition, the attachment members 70 provide the ends 72, 74 with increased strength and rigidity so that the filter element 8 can be quickly and easily attached to the base 4.

Optional holes 76 that mate with protrusions 48 are provided in the attachment members 70 and serve to attach the filter element 8 to the base 4 and maintain the filter element 8 in its expanded condition when the filter element 8 is placed in the base 4. Other conventional means for attaching the filter element 8 to the frame 2 such as pinching the attachment members 70 between the base 4 and cover 6, hook and loop fasteners, adhesive, clips, clamps or the like may also be used. The attachment members 70 may be formed of any suitable material including metal foils, paperboard, cardboard, chipboard, synthetic plastic materials including plastic film, or multiple layers of filter media laminated together.

While any pleated fibrous filter media may be used, a preferred filter media is an electrostatically charged media. The media may be either relatively stiff and self-supporting or relatively soft and non self-supporting. By "self-supporting" it is meant that the media, with or without a spacing structure, generally maintains its shape when subjected to an air stream. Thus, whether the media is self-supporting or not depends on the physical properties of the media itself, the geometry or construction of the media, and the conditions to which the media is subjected in a particular end use application.

Generally, a stiff self-supporting media has a Gurley stiffness of greater than 50 milligrams for a sample size having a width of 2 inches and a length of 1.5 inches, preferably greater than 100 milligrams for such a sample size, and a soft non self-supporting media has a Gurley stiffness of less than 30 milligrams for a sample size having a width of 2 inches and a length of 1.5 inches. For media having stiffness values between these values, whether the media is self-supporting depends on the construction of the media and on the end use application.

If the media is self-supporting, the support ribs 32 may not be required because the media will maintain its shape when subjected to the air stream. On the other hand, if the media is non self-supporting, ribs 32 are needed to support and space the media when the filter element is placed in an air stream to prevent the pleats 12 from bowing or collapsing.

A generally self-supporting filter media is Accuair 2.0 ounce per square yard filter media available from Kimberly Clark Corporation, Neenah, Wis. having a Gurley stiffness of approximately 120 milligrams for a sample size having a width of 2 inches and a length of 1.5 inches. A non self-supporting filter media is Filtrete GCB 40 filter media available from 3M Company, St. Paul, Minn. having a Gurley stiffness of approximately 15 milligrams for a sample size having a width of 2 inches and a length of 1.5 inches. A suitable spacing structure is a reinforcing fabric available from Bayex Inc., Albion, N.Y. under the product number DPM 4410 P3A-2-24. This product is an open scrim having four strands per inch of 70 denier polyester thread. The scrim is provided with an adhesive that allows the scrim to be applied directly to the filter media.

To install the filter element 8 into the frame 2, the frame 2 is placed on a surface so that the base 4 is beneath the cover 6. The frame 2 is then opened as shown in FIG. 1 by releasing the latches 44 and pivoting the cover 6 upwardly away from the base 4. The filter element 8 is then fully expanded by first orienting the filter element 8 so the scrim 14 facing up, and then grasping the attachment members 70 and separating them until the scrim 14 is flat and the pleats are evenly spaced. The filter element 8 is then placed in the base 4 so that the pleats 12 mesh between the ribs 32. The holes 76 in the attachment member 70 are then placed on the protrusions 48 to attach the filter element 8 to the base 4. The cover 6 is then closed to retain the filter element 8 in place, and the latches 44 are re-connected to lock the cover with the base 4. Constructed in this manner, the media 10 is supported from the back which allows the dirty side of the media to be facing up when changing the filter element 8, thereby resulting in less mess. The filter element 8 is removed from the frame 2 by reversing the above steps.

It will be recognized that the filter element 8 may be attached to the cover 6 rather than the base 4. In this manner, the ribs 32 move into the pleats 12 as the frame 2 is closed. This, however, is less desirable because the pleats may require slight manipulation to properly mesh with the ribs 32, and the dirty filter element will be laying with the dirty side facing down during replacement. This, in turn, will produce a mess that must be cleaned up.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A filter assembly comprising:
   (a) a filter frame including a base having at least one longitudinal rail and a cover movably connected with said base; and
   (b) a reversibly expandable filter element removably arranged in said filter frame, said filter element comprising filter media having a plurality of pleats and a flexible sparing structure attached to said filter media, each pleat including a fold line defining a pleat tip and a pair of adjacent panels.

2. A filter assembly as defined in claim 1, wherein the length of said spacing structure between successive pleat tips is less than the length of a panel measured from one pleat tip to the next alternating pleat tip.

3. A filter assembly as defined in claim 1, wherein said base and said cover include corresponding first and second sides edges, said base and said cover second edges being hingably connected.

4. A filter assembly as defined in claim 3, wherein said base and said cover first sides edges are movable between a closed position wherein said first side edges are engaged to enclose the filter element in the frame and an open position wherein said first side edges are displaced to allow the filter element to be inserted into the frame.

5. A filter assembly as defined in claim 4, wherein said base and said cover first side edges include a latch to releasably connect said first side edges and maintain the frame in its closed condition.

6. A filter assembly as defined in claim 1, wherein said base includes a plurality of transverse ribs corresponding to the pleats in the filter media and said ribs mesh between the pleats in the filter media.

7. A filter assembly as defined in claim 6, wherein said ribs are equally spaced.

8. A filter assembly as defined in claim 7, wherein said longitudinal rail includes spacer portions corresponding to the shape of the filter pleats in the region of each rib.

9. A filter assembly as defined in claim 8, wherein said longitudinal rail and said ribs form a grid structure.

10. A filter assembly as defined in claim 1, wherein said frame includes a securing mechanism arranged to retain ends of said filter element in said frame.

11. A filter assembly as defined in claim 10, wherein said securing mechanism includes projections on said base that mate with corresponding holes in said cover.

12. A filter assembly as defined in claim 11, wherein said base and said cover include associated first and second ends, and further wherein said base first and second ends each include a pair of spaced projections and said cover first and second ends cinch include a pair of aligned holes.

13. A filter assembly as defined in claim 12, wherein said frame is formed of a synthetic plastic material.

14. A filter assembly as defined in claim 1, wherein said frame includes a perimeter structure containing finger indentations to allow a user to manually grasp said frame.

15. A filter assembly as defined in claim 1, wherein said frame includes an air flow direction indicator for assisting the user in properly orienting the filter frame in an air duct.

16. A filter assembly as defined in claim 1, wherein said frame is for an air filter for a residential heating or cooling system.

17. A filter assembly as defined in claim 1, wherein said spacing structure is an open scrim formed of a synthetic plastic material.

18. A filter assembly as defined in claim 17, wherein said filter media has opposed inlet and outlet sides and said scrim is arranged along said inlet side.

19. A filter assembly as defined in claim 18, wherein said scrim is provided in the form of at least one strip arranged perpendicular to said fold line along an interior portion of said filter media.

20. A filter assembly as defined in claim 19, wherein the length of the spacing structure between successive pleat tips is equal, thereby providing uniform spacing of said pleat tips.

21. A filter assembly as defined in claim 20, wherein the length of the spacing structure between successive pleat tips is at least 5 millimeters.

22. A filter assembly as defined in claim 1, further comprising an attachment member along opposed first and second ends of said filter media for securing said filter element to said filter frame.

23. A filter assembly as defined in claim 22, wherein each said attachment member contains holes adapted to mate with respective projections on said filter frame.

24. A filter assembly as defined in claim 1, wherein said filter media has a Gurley stiffness of less than 100 milligrams.

25. A filter assembly comprising:
   (a) a filter frame including a base having at least one longitudinal rail and a plurality of transverse ribs and a cover movably connected with said base; and
   (b) a replaceable filter element removably arranged in said filter frame, said filter element comprising filter media having an inlet side, an outlet side, and an interior face region, said filter media further having a plurality of pleats adapted to, mesh with said ribs and a flexible spacing structure attached to said filter media, each pleat including a fold line defining a pleat tip and a pair of adjacent panels.

26. A filter assembly as defined in claim 25, wherein the length of said spacing structure between successive pleat tips is less than the length of a panel measured from one pleat tip to the next alternating pleat tip.

27. A filter assembly as defined in claim 26, wherein the number of pleat openings in one face of said filter media corresponds to the number of ribs, and said filter element can be expanded and placed into said filter frame such that said pleat openings mesh with said ribs.

28. A filter assembly as defined in claim 25, wherein said spacing structure is inelastic.

29. A filter element as defined in claim 28, wherein said spacing structure contains openings to allow air to flow readily through said structure.

30. A filter element as defined in claim 29, wherein successive pleat tips define an attachment surface and said spacing structure is attached to said entire attachment surface.

31. A filter element as defined in claim 30, wherein said spacing structure is arranged along said filter media inlet side.

32. A filter element as defined in claim 31, wherein said spacing structure is an open scrim formed of a synthetic plastic material.

33. A filter element as defined in claim 25, farther comprising attachment members along opposed first and second ends of said filter media parallel to said fold lines for securing said filter element to the filter frame.

34. A filter assembly comprising:
  (a) a filter frame including a base having at least one longitudinal rail and at least one transverse rib; and
  (b) a reversibly expandable filter element removably arranged in said filter frame, said filter element comprising filter media having a plurality of pleats and a flexible spacing structure attached to said filter media, each pleat including a fold line defining a pleat tip and a pair of adjacent panels;
  (c) wherein said at least one rib meshes between pleats in the filter media;
  (d) and further wherein said at least one rail includes a spacer portion corresponding to a shave of the fiber pleats in a region of said at least one rib.

* * * * *

UNITED STATES PATENT AND TRADEMARK OFFICE
CERTIFICATE OF CORRECTION

PATENT NO. : 6,860,916 B2
DATED : March 1, 2005
INVENTOR(S) : Kubokawa, James O.

It is certified that error appears in the above-identified patent and that said Letters Patent is hereby corrected as shown below:

Column 7,
Line 38, delete "sparing" and insert -- spacing --, therefore;

Column 8,
Line 13, delete "cinch" and insert -- each --, therefore;
Line 60, after "to" delete ",";

Column 10,
Line 1, delete "farther" and insert -- further --, therefore;
Line 17, delete "shave" and insert -- shape --, therefore;
Line 17, delete "fiber" and insert -- filter --, therefore.

Signed and Sealed this

Nineteenth Day of July, 2005

JON W. DUDAS
*Director of the United States Patent and Trademark Office*